Figure 7:
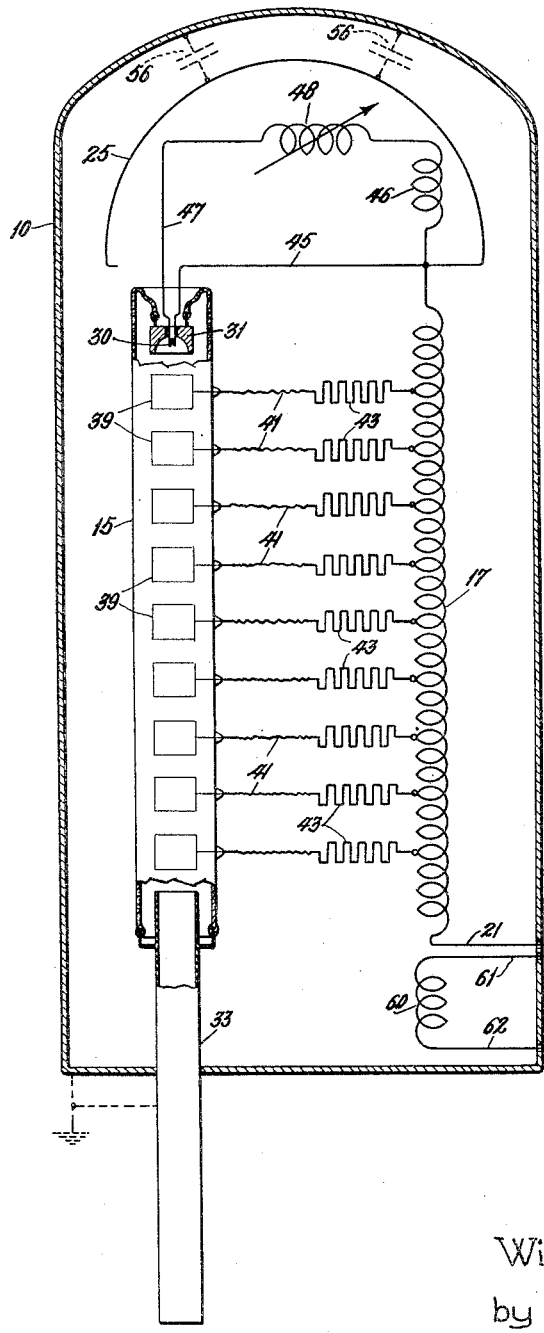

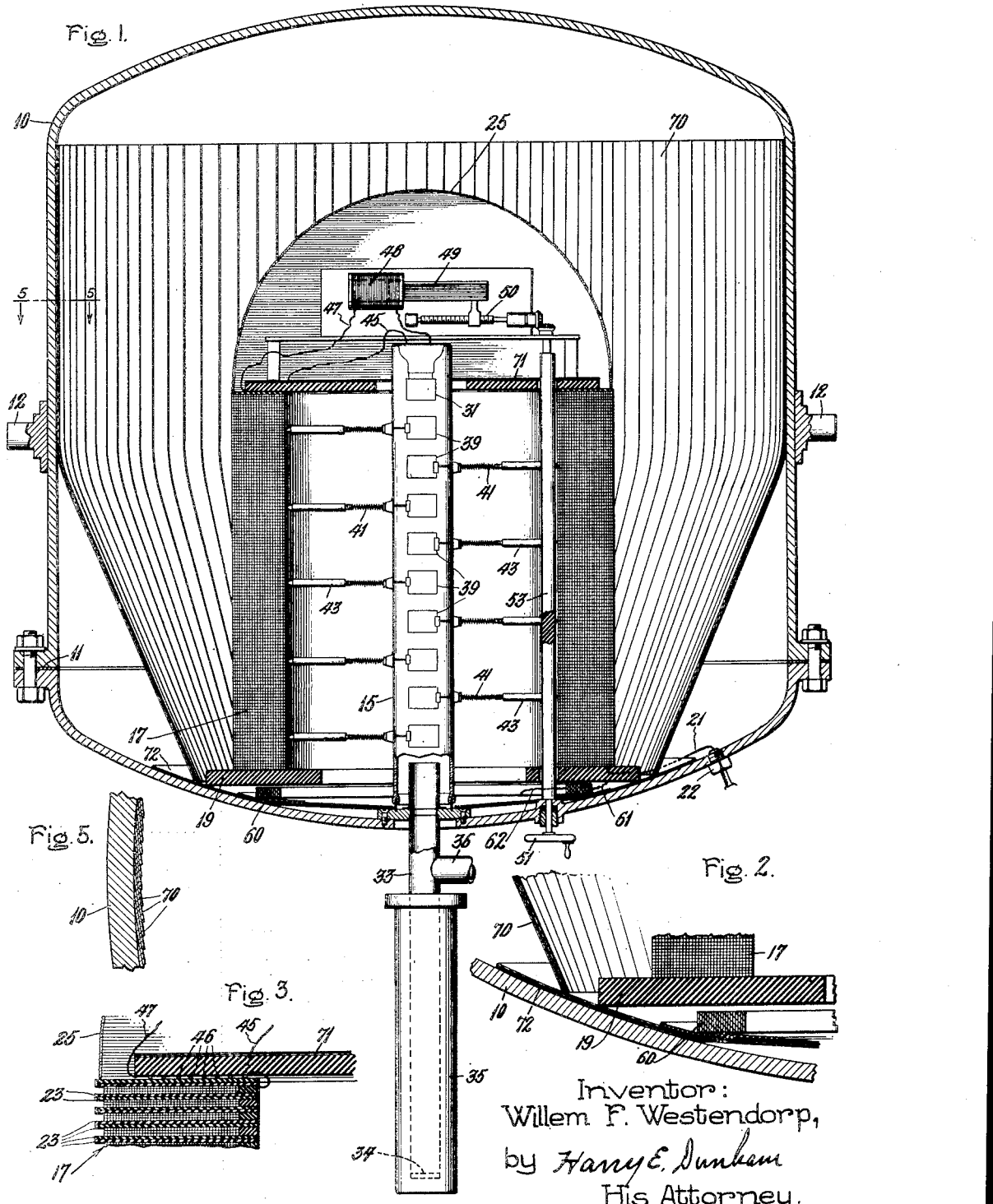

Jan. 17, 1939.   W. F. WESTENDORP   2,144,518
HIGH VOLTAGE APPARATUS
Filed Nov. 11, 1937   3 Sheets-Sheet 2
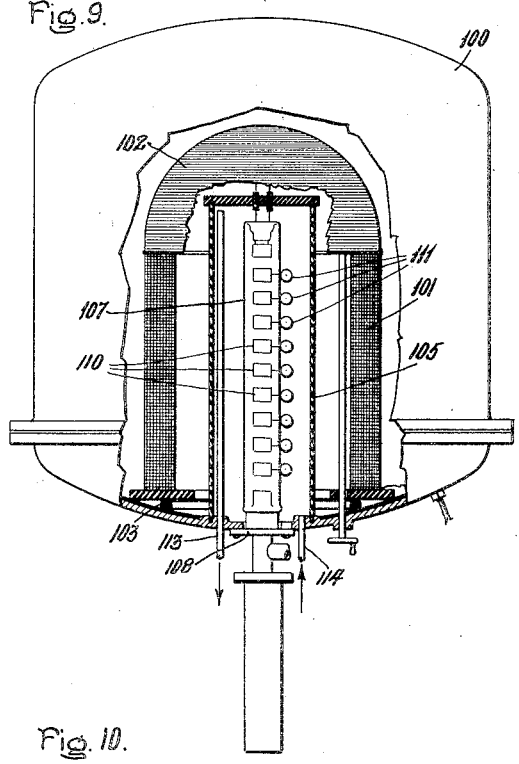
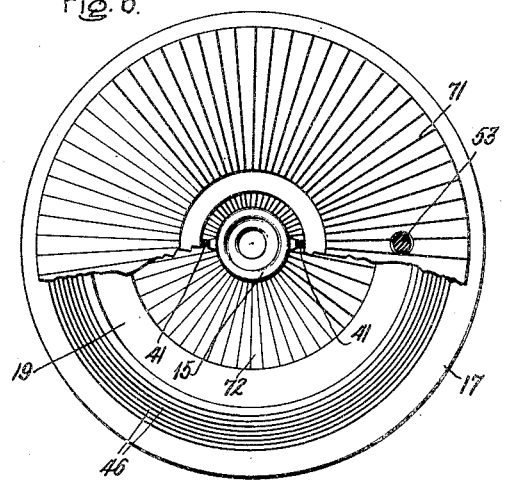
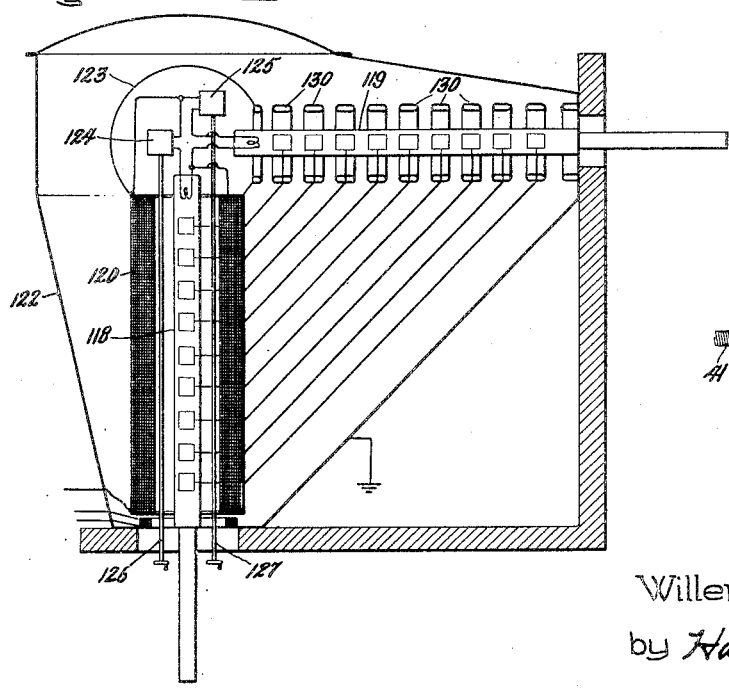
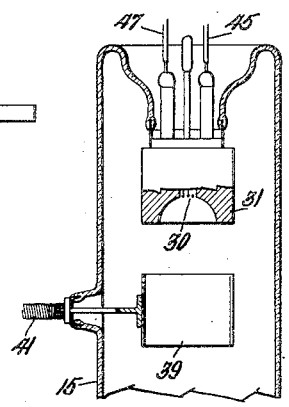
Inventor:
Willem F. Westendorp,
by Harry E. Dunham
His Attorney.

Jan. 17, 1939.  W. F. WESTENDORP  2,144,518
HIGH VOLTAGE APPARATUS
Filed Nov. 11, 1937  3 Sheets—Sheet 3

Inventor:
Willem F. Westendorp,
by Harry E. Dunham
His Attorney.

Patented Jan. 17, 1939

2,144,518

UNITED STATES PATENT OFFICE 2,144,518

HIGH VOLTAGE APPARATUS

Willem F. Westendorp, Schenectady, N. Y., assignor to General Electric Company, a corporation of New York Application November 11, 1937, Serial No. 174,029

16 Claims. (Cl. 250—93)

The present invention relates to high voltage apparatus including the combination of an energy source and a load device. While not limited thereto, the invention is primarily applicable in connection with high voltage X-ray equipment.

The discovery of new fields of usefulness for X-rays of great penetrative power has created an active demand for ultra high voltage X-ray equipment. However, the relatively great size and spacing of parts required to afford adequate insulation of such equipment has made it difficult to provide apparatus which is sufficient flexible for any but highly specialized use.

It is one object of this invention to provide high voltage apparatus which, when applied in connection with X-ray equipment, will make possible the production of compact units operable at voltages up to and above 1,000,000 volts.

It is a further object to provide electric discharge apparatus, irrespective of voltage rating, which is of less weight and bulk than that heretofore available.

In accomplishing these objects, I substitute for the iron core transformer usually employed as a high voltage source, a resonant system having an open-magnetic-circuit inductance coil as its principal inductive element.

It is a particular object of this invention to embody such a system in an apparatus which is adapted to the requirements of commercial practice. Specifically, it is my object to provide a compact high voltage apparatus of the series resonant type which is shock-proof, mechanically rugged, and efficient in operation.

One important feature of the invention consists in the provision of an inductance coil of the open-magnetic-circuit type which is so constructed, arranged and shielded as to reduce to a minimum the casing dimensions required for insulating safety.

Another feature, important in connection with the reduction of power losses, comprises the provision of means for effectively shielding the casing and other parts of the apparatus from the magnetic effects of the inductance coil.

Another feature consists in placing the X-ray tube within the confines of the inductance coil in such an arrangement as to avoid the creation of strong radial fields within the space enclosed by the coil.

A still further feature comprises the provision of an externally accessible reentrant chamber extending within the confines of the inductance coil and adapted to receive an electric discharge tube, such tube being thus separated from the main body of the casing.

Figure 8:
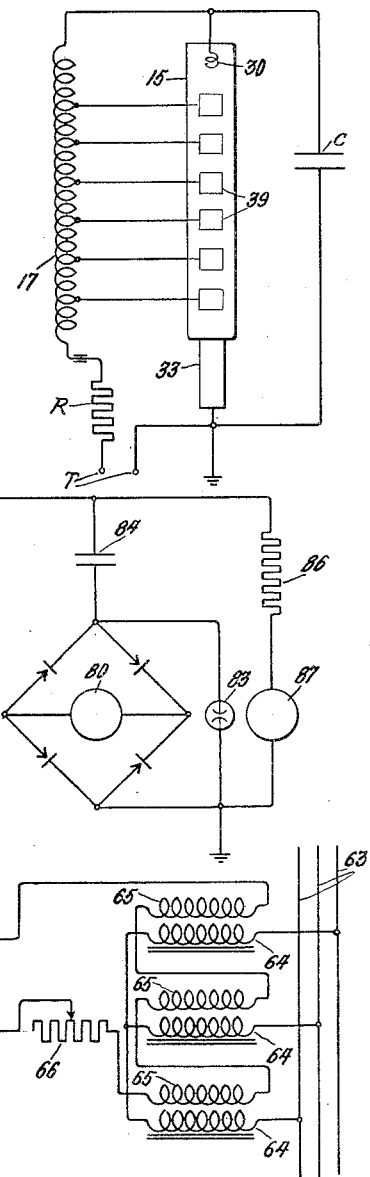

The aspects of the invention which I desire to protect herein are pointed out with particularity in the appended claims. The invention itself, together with further objects and advantages thereof, may best be understood by reference to the following description taken in connection with the drawings in which Fig. 1 is a view in section of a high voltage apparatus suitably embodying the invention; Figs. 2 and 3 are fragmentary sectional views illustrating in detail certain features of Fig. 1; Fig. 4 is a detail view in section of a portion of the discharge device shown in Fig. 1; Fig. 5 is a fragmentary section taken on line 5—5 of Fig. 1; Fig. 6 is a plan view of the high voltage inductance coil of Fig. 1 as seen from above with the electrostatic shielding member removed and a part of the additional superstructure broken away; Fig. 7 is a schematic diagram of the circuit connections of the apparatus of Fig. 1; Fig. 8 is a simplified circuit diagram useful in explaining the operation of the circuit of Fig. 7, and Figs. 9 and 10 are schematic representations illustrating certain modified applications of the invention.

Referring particularly to Fig. 1, I have shown an enclosing metal casing 10 which as viewed from above is of generally circular configuration so as to present a smooth interior surface devoid of sharp corners and pointed projections. For convenience in assembly, the casing may comprise separable upper and lower portions which in the finished assembly are tightly joined by a bolted and gasketed joint indicated by 11. It may also be associated with a suitable structure (not shown) for rotatably supporting the apparatus by means of trunnions 12, these being preferably so arranged that their axis passes through the center of gravity of the apparatus.

Within the casing there is provided a load device, illustrated as a multi-electrode X-ray tube 15, and an energizing means comprising an elongated annular inductance coil 17. These are preferably surrounded by an insulating medium such as a liquid, or a compressed gas or vapor, having a dielectric strength greater than that of air. The details of construction and arrangement of the induction coil will be described first.

The lower end of the coil 17 is supported from the casing by means of an insulating base 19. It may be grounded directly to the casing or connected to it indirectly through suitable metering apparatus. If an indirect connection is to be used, a terminal therefor may be provided by a lead-in conductor 21 which is brought to the outside of the casing through an insulating bushing 22. The upper end of the coil is insulatingly spaced from the casing and is adapted to be at high potential with respect to it during the operation of the apparatus.

In order to avoid the presence within the interior of the coil 17 of parts capable of producing strong radial fields, the coil comprises an open magnetic circuit, that is to say, a magnetic circuit which does not include a core of iron or other low reluctance material extending through the space enclosed by the coil. As a result of this construction, it is unnecessary to base the interior dimensions of the coil on requirements imposed by insulating considerations. Instead, the internal diameter of the coil is determined by other factors which permit a smaller, more compact arrangement than is possible with the iron core constructions ordinarily employed in energizing apparatus for high voltage devices.

In order that the coil may have sufficient inductance to permit a high voltage to be developed across it at a reasonably low frequency and in spite of the absence of a closed core, it should be provided with a very large number of turns. The number chosen depends, of course, on the potential desired to be created, the frequency to be used, and on the various other factors which customarily enter into the design of high-voltage apparatus. In order to produce a potential on the order of 1,000,000 volts with a coil 25 inches in diameter and about 25 inches in height, I have found it desirable to employ as many as 150,000 turns for operation at 180 cycles. The use of so many turns requires that the coil structure be carefully built up so as to give it rigidity and to prevent electrical breakdown between the various coil elements. A coil construction which is well adapted for this purpose is illustrated in the enlarged fragmentary view provided in Fig. 3. (In order to simplify the drawings, the structural details of the coil are omitted in Figs. 1 and 2).

As shown, the coil comprises a series of superposed annular elements or layers, each comprising a number of serially connected turns of relatively fine wire. The various turns in each layer are insulated from one another by means of a suitable insulating covering, and the successive coil layers, are separated by interposed disk-like members 23. These members may consist, for example, of pressboard. They are preferably of such dimensions as to project slightly beyond the coil layers so as to increase the creepage path between such layers.

The coil thus formed comprises a compact rigid structure which is of such uniform longitudinal construction as to assure the substantial absence of sharply varying potential gradients and to minimize the possibility of electrical breakdown from this cause.

The various parts of the coil 17 should be sufficiently spaced from the walls of the casing to prevent sparkover thereto at the maximum operating potential of the apparatus. It is found, however, that in the absence of precautionary measures the high potential gradients occurring in the vicinity of the end turns of the coils require an impractically great spacing for safety to be assured. In order to overcome this difficulty I provide means for improving the field distribution at the high potential end of the coil, such means comprising a conducting shield fitted on to the end of the coil and presenting a smoothly rounded surface having a large radius of curvature. In view of the fact that the arrangement which I have described does not involve the use of a magnetic core or other magnetic structure projecting from the end of the coil, I am enabled to enclose the coil end completely in a substantially hemispherical shield 25 and thus to employ a space factor appreciably below that which would be allowable with any other form of shielding construction.

In order to prevent the generation of excessive circulating currents within the body of the shield 25 during the operation of the device, I prefer to construct the shield of a large number of juxtaposed insulated elements which are built up in the desired form. Thus one may use for this purpose a shield of which the various elements comprise successive turns of insulated copper wire which has been wound on a hemispherical form. The shell thus built up may be given a rigid character by the use of a bonding substance such as a suitable varnish or resin. In order that the dielectric medium contained within the casing 10 may circulate freely through the wall of the shield, I prefer that at least a portion of such wall shall be left free of the bonding substance so as to be readily permeable.

In view of the absence of a closed magnetic circuit, it is not practicable to energize the inductance coil 17 by direct transformer action as is customary with the devices of the prior art. A very high voltage may be developed across the coil, however, by connecting it in series with suitable capacitive elements and supplying energy to the circuit combination thus formed at a frequency adapted to cause resonance oscillations. Such a resonant circuit arrangement is indicated schematically in Figs. 7 and 8 and will be described more fully hereinafter. It may be noted at this point, however, that for the purpose of exciting the resonant system there is provided a primary coil 60 (Figs. 1 and 2) preferably comprising a few turns of copper ribbon positioned adjacent to the lower end of the coil 17 and thus inductively coupled therewith. This primary winding is provided with terminal connections which are indicated at 61 and 62 and which in actual use are brought out through the wall of the casing for connection to a suitable source of potential.

In order to prevent large power losses due to the generation of excessive circulating currents in the walls of the casing 10 by the magnetic effects of the coil 17, there is provided means for magnetically shielding the casing from the coil. In the arrangement illustrated such means comprises a sheathing 70 (see Fig. 1) of magnetic material having a laminated construction effective to prevent excessive eddy currents. This sheathing may suitably consist of silicon steel and is preferably applied as a shingle-like arrangement of overlapping strips. (Fig. 5). Similar sheathing may be arranged transversely at the top and bottom of the coil as indicated at 71 and 72 (Figs. 1 and 6) to protect the main electrodes of the discharge device 15 from magnetic effects. The sheaths 71 and 72 also perform an electrical as well as a magnetic function in that their substantially parallel surfaces serve to produce a generally uniform electrostatic field distribution in the region between them. Since this region includes the center space enclosed by the coil 17, the longitudinal field distribution within this space is also maintained substantially uniform.

The potential developed across the coil 17 is employed to energize a load device which, in the present case, is illustrated as an X-ray-producing electric discharge device 15 having its terminals connected to the terminals of the coil. The fact that the space enclosed by the coil is not obstructed by a magnetic core structure makes it feasible to arrange the X-ray tube axially within the coil, thus achieving a very compact arrangement of the apparatus as a whole. In order to prevent the creation of strong radial fields within the coil as a result of the presence of the discharge device, the main electrodes of the device are preferably spaced by an amount which corresponds at least approximately to the length of the coil 17. Such an arrangement facilitates the maintenance along the axis of the coil (i. e. within and along the discharge device) of substantially the same longitudinal field distribution as exists along the inner surface of the coil.

The particular X-ray-producing device illustrated comprises a cathode, including an incandescible filament 30 and a focusing cup 31 (see Fig. 4), and an anode in the form of an elongated metal tube 33 projecting outside the casing 10. The active target portion of the anode may comprise, for example, a tungsten button arranged adjacent to the outer extremity of the anode as indicated in dotted outline at 34. In the region of the target the anode is provided with an external cooling jacket 35 adapted to receive a cooling medium such as water. It may also be sheathed in a protective covering (not shown) of an X-ray impervious material such as lead. Appended to the anode there is shown an exhaust duct 36 adapted for connection to a continuously operative pumping system, but it should be understood that the discharge device may alternatively be evacuated and sealed off prior to assembly in the apparatus structure.

In order to prevent charging of the inner wall surfaces of the discharge envelope and consequent faulty operation of the device, there are provided a series of intermediate electrodes 39 comprising hollow tubular conducting members so arranged as to shield the wall of the tube from the discharge stream. These members are preferably split longitudinally so as to prevent the generation of excessive circulating currents therein and are respectively connected to elements of the coil 17 which are in the same radial planes as the electrodes themselves. The connections may conveniently include resilient conductors (shown in the drawings as coil springs 41) and serve to prevent the accumulation of charges on the intermediate electrodes with a consequent disturbance of the desired electrostatic field distribution along the axis of the coil. In order to avoid the possibility of excessive local currents in the event of an accidental short circuit between two adjacent intermediate electrodes, I employ resistors 43 connected in series with the various electrodes as shown in Fig. 1.

The cathode of the discharge device is electrically connected to the high potential end of the coil 17 by means of a conductor 45. Heating current for raising the filament 30 to a temperature of effective electron emission is supplied by the use of a few additional turns 46 applied to the upper end of the coil 17 as illustrated in Fig. 3. These turns are connected in series with the filament by means which include a conductor 47 and an inductor 48. Regulation of the heating current is accomplished by means of an adjustable iron core 49 which is free to move with respect to the inductor 48. The position of this core may be controlled externally of the casing by lead screw 50 which is connected to a crank or other suitable driving means 51 through an insulating shaft 52.

The elements of the energizing circuit for the X-ray-producing device 15 are shown diagrammatically in Fig. 7 in which parts corresponding to those previously described are similarly numbered. By reference to this figure it will be seen that the coil 17 is connected directly to the shield 25 and is in series with the capacitance (indicated in dotted outline at 56) which exists between this shield and the surrounding casing 10, and partially in series with the distributed capacity of the coil itself. It is contemplated by the invention that the parts of the apparatus shall be so proportioned that at some practical frequency the inductance of the coil 17 is just balanced by (i. e. is resonant with) the total inherent capacitance of the apparatus. However, for relatively low voltage apparatus (i. e. apparatus intended for use at voltages below about 500,000 volts) it may be necessary to augment this inherent capacity by the use of condensers connected in series with the coil 17 and placed within the casing 10.

The operation of a circuit such as that under consideration may best be understood by reference to Fig. 8 wherein the various elements of the circuit of Fig. 7 are shown in a simplified relationship. In this figure the inductance coil is identified as before by the numeral 17, and the X-ray-producing device by the numeral 15. The total series capacitance, however provided, is indicated at C. The resistance of the system, including the ohmic resistance of the coil 17 and the effective energy-consuming resistance of the X-ray-producing device are represented at R. The X-ray-producing device itself, including the cathode 30, the anode 33 and the intermediate electrodes 39, are shown as being connected across the coil so as to be subjected to the potential developed at its terminals.

In order that a high potential may be developed across the terminals of the coil 17 it is necessary that energy be supplied to the resonant system of such character as to induce resonant oscillations therein and to supply the losses in the resistance R. This is preferably accomplished by introducing into the circuit an exciting voltage having a frequency of alternation which is the same or approximately the same as the frequency at which the coil 17 and the capacitance C are adapted to resonate. Such a voltage may be introduced directly, as by application of a source of potential to the terminals T or indirectly by the use of a primary coil which is inductively coupled with the coil 17. It is this latter arrangement which is illustrated in Figs. 1 and 7, wherein the element 60 constitutes the primary coil referred to. Using the construction shown, with about 150,000 turns in the coil 17 and about 20 turns in the coil 60, I have found it possible to develop a potential in excess of 1,300,000 volts across the terminals of the former by supplying to the latter an exciting potential having a frequency the same as that to which the resonant system is tuned.

In order to maintain the dielectric and other losses of the system within reasonable limits, it is desirable to design the system to have a resonance frequency below about 2,000 cycles. On the other hand, since the amount of energy which may be drawn from a resonant system without producing undue damping increases with frequency, it is advantageous to use a frequency which is above the ordinary commercial frequency of 60 cycles per second. An effective compromise in this connection may be accomplished by utilizing a resonance frequency which is a small multiple of a commercial frequency. In Fig. 7 I have shown means by which a voltage of such a multiple frequency may be obtained by the use of static (i. e. non-rotary) apparatus.

The apparatus shown utilizes a three-phase commercial frequency source 63 connected to a group of three saturable reactors 64, such reactors being arranged in a Y connection. It is known that the voltages which appear across these saturable reactors connected as indicated will contain a strong third harmonic component (i. e. a component having a frequency three times as great as the frequency of the supply source). Thus, if the supply source 63 has a frequency of 60 cycles the voltages across the reactors 64 will possess a component having a frequency of 180 cycles. These voltages may conveniently be utilized by providing secondary coils 65 which are coupled with each of the reactors 64 and which are serially connected in open delta as shown, the terminals of the open delta being connected to the terminals of the coil 60. The voltage applied to the coil by the circuit arrangement indicated will comprise a generally sinusoidal wave form having a frequency of 180 cycles. The magnitude of this voltage may be adjusted by use of a series impedance such as a series resistor 66.

The current passing through the coil 17 during operation of the apparatus will be found to comprise both a direct current component and an alternating component. The former comprises the rectified current drawn by the X-ray, while the latter, being the exciting current of the resonant system, varies in direct proportion to the voltage developed across the resonant elements of the resonant system. In Fig. 7 I have shown a metering system whereby the alternating and direct current components may be measured separately thereby to determine both the potential developed across the coil 17 and the current loading of the X-ray device.

For measuring the alternating component of current there is provided a direct current milliammeter 80 connected between the low potential end of the coil 17 and ground. This is associated with a full wave rectifying system comprising four rectifiers arranged as shown and a glow lamp 83 connected across the meter for protective purposes. A condenser 84 in series with the metering elements permits only alternating current to pass and be measured. Under these conditions, if the meter 80 is properly calibrated, its readings will indicate and measure variations in the voltage across the coil 17.

A branch circuit comprising a relatively high resistor 86 and a second direct current meter 87 is connected in shunt to the alternating current metering system just described.

Although some alternating current may be transmitted through the meter 87, its inherent characteristics will permit it to indicate only the direct current flow, this being the quantity desired to be measured in order to determine the loading of the X-ray tube 15. The effect of the resistor 86 and the meter 87 in shunting a certain proportion of the alternating current from the meter 80 may be taken into account in the calibration of the latter.

In Fig. 9 I have illustrated an alternative application of the invention. In this figure there is shown a casing 100, an elongated annular coil 101, a hemispherical shield 102 and a primary or input winding 103, these elements being generally similar to the corresponding elements previously described. However, the present embodiment differs from that of Fig. 1 in that there is provided a reentrant chamber 105 extending into the space confined by the coil 101 and the shield 102. This chamber is preferably constructed of insulating material and should be of such nature that its interior space is completely separate from the main body of the casing 100.

Within the chamber 105 and arranged coaxially with it and with the coil 101 there is provided an X-ray-producing discharge device 107 which is, in most particulars, similar to the device previously described in connection with Fig. 1. However, the device 107 is preferably detachably mounted so as to be removable from the chamber 105 upon the disassembly of an externally accessible sealed joint (indicated at 108). This permits the device to be repaired and replaced from time to time without the need for opening the main body of the casing.

It is an advantage of the construction just described that different insulating media may be used in the casing 100 and in the chamber 105. In order to decrease the overall weight of the apparatus, I prefer to employ in the main casing a dielectric medium comprising a gas or a vapor under pressure. An example of a vapor suitable for such use comprises dichloro difluoro methane or one of the related chlorine-fluorine derivatives of aliphatic hydrocarbons described and claimed in application Serial No. 155,943 of F. S. Cooper, filed July 27, 1937, and assigned to the same assignee as the present invention. Dichloro difluoro methane when utilized at a pressure of from one to several atmospheres has a dielectric strength many times in excess of that of air.

Within the chamber 105 I may employ an insulating liquid and preferably a liquid having a resistivity below about $10^{12}$ ohms centimeters. One example of such a liquid comprises a mixture of transformer oil and a small amount, say 1%, of Gilsonite, the latter ingredient having the function of increasing the conductivity of the mixture. By using a relatively low resistance dielectric of this character the inherent conductivity of the medium may be relied on for carrying off the charges which tend to accumulate on the intermediate electrodes 110 of the discharge device. To facilitate such charge removing operation, the electrodes may be provided with spherical terminals 111 which are in contact with the surrounding liquid dielectric but which are not directly connected to the coil 101.

To assist in filling the chamber 105 with liquid insulation when the apparatus is initially assembled or when it is being reassembled after repair operations, there are provided a pair of fluid ducts 113 and 114. It will be clear that the duct 113, which is preferably of insulating material makes possible the withdrawal of gas from the top of the chamber as liquid medium is conducted into the chamber through the duct 114. These ducts are, of course, intended to be sealed off before the apparatus is placed in use.

While the arrangement of the X-ray-producing device at the axis of the induction coil possesses numerous advantages, such an arrangement is not an essential feature of my present invention. In Fig. 10 I have shown a further embodiment of the invention in which two independently usable X-ray devices are provided (respectively indicated at 118 and 119), one being within the interior of an inductance coil 120 and the other outside the coil and arranged transversely thereto. These elements are enclosed within a common casing 122, and the cathode ends of both X-ray-producing devices project into a common electrostatic shield 123 arranged to cover the high potential end of the induction coil. Separate externally operable control means comprising adjustable elements 124 and 125 and drive shafts 126 and 127 are provided in connection with the respective devices.

The arrangement and connections of the device 118 are essentially the same as those previously described in connection with Fig. 1. The connections for the intermediate electrodes of the device 119, on the other hand, extend from the outside of the coil 120. Furthermore, the various intermediate electrodes are provided with electrostatic shields in the form of conducting toroidal members 130, each shield being arranged to surround its associated intermediate electrode and being disposed between such electrode and the wall of the casing. The use of shields of this type in this connection is described and claimed fully in copending application Serial No. 113,862 filed in the names of E. E. Charlton and W. F. Westendorp on December 2, 1936, and assigned to the same assignee as the present invention. The arrangement which I have shown in Fig. 10 has the advantage of providing two independent X-ray sources both operated by a common energizing means but adapted to emit X-ray beams in different directions. The flexibility of such an arrangement is particularly advantageous in connection with extremely high voltage units in which the bulk of the apparatus is necessarily so great as to prevent convenient manipulation of the equipment as a whole.

While I have described my invention with reference to particular embodiments thereof, it will be understood that many modifications may be made by those skilled in the art without departing from the invention. In the appended claims I aim to cover all such variations of structure and use as fall within the true spirit and scope of the foregoing disclosure.

What I claim as new and desire to secure by Letters Patent in the United States is:

1. In high voltage apparatus, an enclosing casing, an elongated annular inductance coil enclosed by the casing and having at least one end thereof at high potential with respect to the casing during operation of the apparatus, said coil having an open magnetic circuit in the space enclosed by the coil, a substantially hemispherical conducting shield covering the high potential end of the coil for improving the field distribution thereabout, said coil and shield being sufficiently spaced from the walls of the casing to prevent sparkover thereto at the maximum operating potential of the apparatus, means for energizing the coil, and a load device having its terminals connected to the terminals of the coil.

2. In high voltage apparatus an enclosing casing, an elongated annular inductance coil enclosed by the casing and having at least one end thereof at high potential with respect to the casing during operation of the apparatus, said coil having an open magnetic circuit in the space enclosed by the coil, a substantially hemispherical conducting shield covering the high potential end of the coil for improving the field distribution thereabout, said coil and shield being sufficiently spaced from the walls of the casing to prevent sparkover thereto at the maximum operating potential of the apparatus, means for energizing the coil, and a discharge device arranged axially of the coil and extending at least partially into the space enclosed by the coil, said device being electrically connected to the coil so as to be energized thereby.

3. In high voltage discharge apparatus, an enclosing casing, an elongated annular coil enclosed by the casing, means for developing a high potential between the ends of the coil during the operation of the apparatus, and an electrical discharge device arranged axially within the coil and having its main electrodes connected to the terminals thereof, the spacing of said main electrodes being approximately equal to the length of the coil so as to facilitate the maintenance within and along the discharge device of substantially the same longitudinal field distribution as is maintained along the inner surface of the coil.

4. In high voltage apparatus, an enclosing casing, an elongated coil enclosed by the casing, means for developing a high potential between the ends of the coil during operation of the apparatus, and an electrical discharge device arranged axially within the coil and comprising main and intermediate electrodes connected to various elements of the coil, the spacing of the main electrodes being at least approximately equal to the length of the coil and each intermediate electrode being connected to a coil element which lies in approximately the same radial plane as the electrode itself.

5. In high voltage discharge apparatus, an enclosing casing, an elongated annular coil within the casing and having at least one end thereof at high potential with respect to the casing, a conductive shield encasing said high potential end of the coil, said coil and shield being sufficiently spaced from the casing to prevent sparkover thereto at the maximum operating potential of the apparatus, an electrical discharge device extending within the space confined by the coil and the shield and arranged axially of the coil, and connections between main electrodes of the discharge device and the terminals of the coil, the conductive parts of the said electrodes being spaced a distance approximately equal to the length of the coil so as to facilitate the maintenance along the axis of the coil of substantially the same longitudinal field distribution as is maintained along the inner surface of the coil, whereby the occurrence of strong radial fields within the coil is avoided.

6. In high voltage discharge apparatus, an enclosing casing, a reentrant chamber extending into the casing, an electrical discharge device positioned within the chamber and separated by the walls thereof from the main body of the casing, an elongated annular induction coil within the main body of the casing and arranged to surround said chamber, means for developing a high potential between the ends of said coil, and connections between the terminals of the coil and the terminals of the discharge device.

7. The combination of claim 6 in which the electrodes of the discharge device are so spaced and arranged that the longitudinal field distribution within and along the axis of the chamber is substantially the same as that along the inner surface of the coil.

8. In high voltage discharge apparatus, an enclosing casing containing an insulating medium having a higher dielectric strength than air, a reentrant chamber extending within the casing, an electrical discharge device removably positioned within the chamber and separated by the walls thereof from the main body of the casing, a quantity of insulating material of high dielectric strength filling the chamber and surrounding the discharge device, an annular inductance coil surrounding the chamber, means for developing a high potential between the terminals of the coil, and connections between the terminals of the coil and the terminals of the discharge device.

9. In high voltage apparatus, an enclosing casing, an elongated coil enclosed by the casing and having at least one end thereof insulatingly spaced from the casing, a substantially hemispherical conducting shield covering said one end of the coil for improving the field distribution thereabout, a resonant system including the coil as an inductive element and the casing and shield as capacitive elements, means for supplying sufficient energy to the system to develop high potentials across various elements thereof, and a load device having its terminals connected to high potential terminals of said resonant system.

10. In high voltage discharge apparatus, an enclosing casing, an elongated annular coil enclosed by the casing and having at least one end thereof insulatingly spaced from the casing, a resonant system including the coil as a principal inductive element thereof, means for supplying sufficient energy to the resonant system to produce a high potential across the terminals of the coil, a substantially hemispherical conducting shield forming a part of the resonant system and covering the said one end of the coil for preventing sparkover to the casing, and a discharge device lying at least partially within the confines of the casing and having its terminals connected to the terminals of said coil.

11. In high voltage discharge apparatus, an elongated annular coil, a resonant system having said coil as a principal inductive element thereof, means for supplying sufficient energy to the resonant system to develop a high potential difference along the length of the coil, and an electrical discharge device arranged axially within the coil and having its terminals connected to corresponding terminals of the coil, the electrodes of said discharge device being so arranged as to facilitate the maintenance within and along the discharge device of substantially the same longitudinal field distribution as is maintained along the inner surface of said coil whereby the occurrence of strong radial fields within the coil is avoided.

12. In high voltage discharge apparatus, an enclosing casing, an elongated annular coil enclosed by the casing and having at least one end insulatingly spaced therefrom, a conducting shield covering said one end of the coil, a resonant system including the coil as a principal inductive element and the casing and shield as capacitive elements thereof, means for supplying sufficient energy to the resonant system to develop a high potential between the terminals of the coil, and a discharge device arranged axially within the coil and having its terminals connected to corresponding terminals of the coil.

13. In high voltage discharge apparatus, an enclosing casing, an elongated annular coil enclosed by the casing and having at least one end insulatingly spaced therefrom, a generally hemispherical conducting shield covering said one end of the coil, a resonant system including the coil as a principal inductive element and the casing and shield as capacitive elements thereof, means for supplying sufficient energy to the resonant system to develop a high potential between the terminals of the coil, a discharge device arranged axially within the coil and having its terminals connected to corresponding terminals of the coil, the electrodes of said discharge device being so arranged as to facilitate the maintenance within and along the device of substantially the same longitudinal potential distribution as is maintained along the inner surface of said coil, whereby the occurrence of strong radial fields within the coil is avoided.

14. An X-ray apparatus comprising an enclosing casing, an elongated annular coil within the casing, said coil having one end thereof electrically grounded to the casing and the other end insulatingly spaced therefrom, a conducting shield covering the last mentioned end of the coil, a resonant system including the coil as a principal inductive element and the shield as a capacitive element, means for supplying sufficient energy to the resonant system to develop a high potential between the terminals of the coil, an X-ray producing discharge device having its cathode-containing end extending into the space enclosed by the coil and conducting shield and its anode-containing end projecting externally of the casing, and connectons between the terminals of the discharge device and the terminals of the coil.

15. X-ray apparatus comprising a metal casing, an inductance coil of hollow configuration within the casing, the space enclosed by the coil constituting an open magnetic circuit, an X-ray tube extending within said space and electrically connected to the terminals of the coil, means for energizing the coil, and laminated ferromagnetic material applied to the inner wall of the casing as a relatively thin sheathing effective to shield the casing from magnetic flux developed by the coil.

16. High voltage apparatus comprising a metal casing, an inductance coil of hollow configuration within the casing, the space enclosed by the coil constituting an open magnetic circuit, a resonant circuit including the coil as a principal inductive element thereof, means for supplying sufficient energy to the resonant circuit to develop a high potential between the terminals of the coil, a load device having its terminals connected to the terminals of the coil, and a thin shell of ferromagnetic material disposed between the external surface of the coil and the inner surface of the casing wall, said shell comprising a laminated sheathing effective to shield the casing from magnetic flux developed by the coil.

WILLIAM F. WESTENDORP.